(12) United States Patent
Arnal

(10) Patent No.: US 6,406,109 B1
(45) Date of Patent: Jun. 18, 2002

(54) MEDIA MAGAZINE LATCH FOR DATA STORAGE LIBRARIES

(75) Inventor: Kevin Arnal, Chanhassen, MN (US)

(73) Assignee: Plasmon IDE, Inc., Eden Prarie, MN (US)

( * ) Notice: Subject to any disclaimer, the term of this patent is extended or adjusted under 35 U.S.C. 154(b) by 0 days.

(21) Appl. No.: 09/663,722

(22) Filed: Sep. 15, 2000

(51) Int. Cl.[7] .............................................. A47B 88/00
(52) U.S. Cl. ..................................................... 312/333
(58) Field of Search .............................. 312/9.48, 9.51, 312/287, 330.1, 333, 223.1, 223.2, 215, 222, 35, 42, 332.1; 292/DIG. 4; 369/34, 36; 221/81, 88

(56) References Cited

U.S. PATENT DOCUMENTS

| 1,052,778 A | * | 2/1913 | Wells ..................... 312/333 X |
| 5,379,184 A | * | 1/1995 | Barraza et al. ......... 312/333 X |
| 5,449,091 A | | 9/1995 | Dalziel ........................ 221/81 |
| 5,754,518 A | | 5/1998 | Dang et al. ................. 369/191 |
| 5,795,042 A | * | 8/1998 | Todor .................... 312/9.48 X |
| 6,034,926 A | | 3/2000 | Dang et al. .................... 369/34 |
| 6,155,659 A | * | 12/2000 | Manes et al. .......... 312/9.48 X |

* cited by examiner

Primary Examiner—James O. Hansen
(74) Attorney, Agent, or Firm—Schwegman, Lundberg, Woessner & Kluth, P.A.

(57) ABSTRACT

A media magazine container utilizes a recirculating latch mechanism that makes minimal use of a solenoid and includes a safety door. The latch mechanism includes a contoured latch arm with a configured opening and a shoulder, a slider moving in a slider track and coupled to the latch arm, and a restoring device, such as a spring, for providing a counteractive force. The mechanism latches a magazine into the container by capturing magazine pins in the shoulder of the latch arm. The magazine can be easily unlatched by forcing the latch arm downward with an actuating device, causing the slider and configured opening to interact. As the magazine is extracted from the container, the slider and configured opening interact in such a manner that when the magazine is fully extracted the latch arm is back to the original position where it first received the magazine, and is ready to receive another. A safety door blocks passage to any objects entering the container other than a media magazine. The latch mechanism can further actuate an external access door.

6 Claims, 10 Drawing Sheets

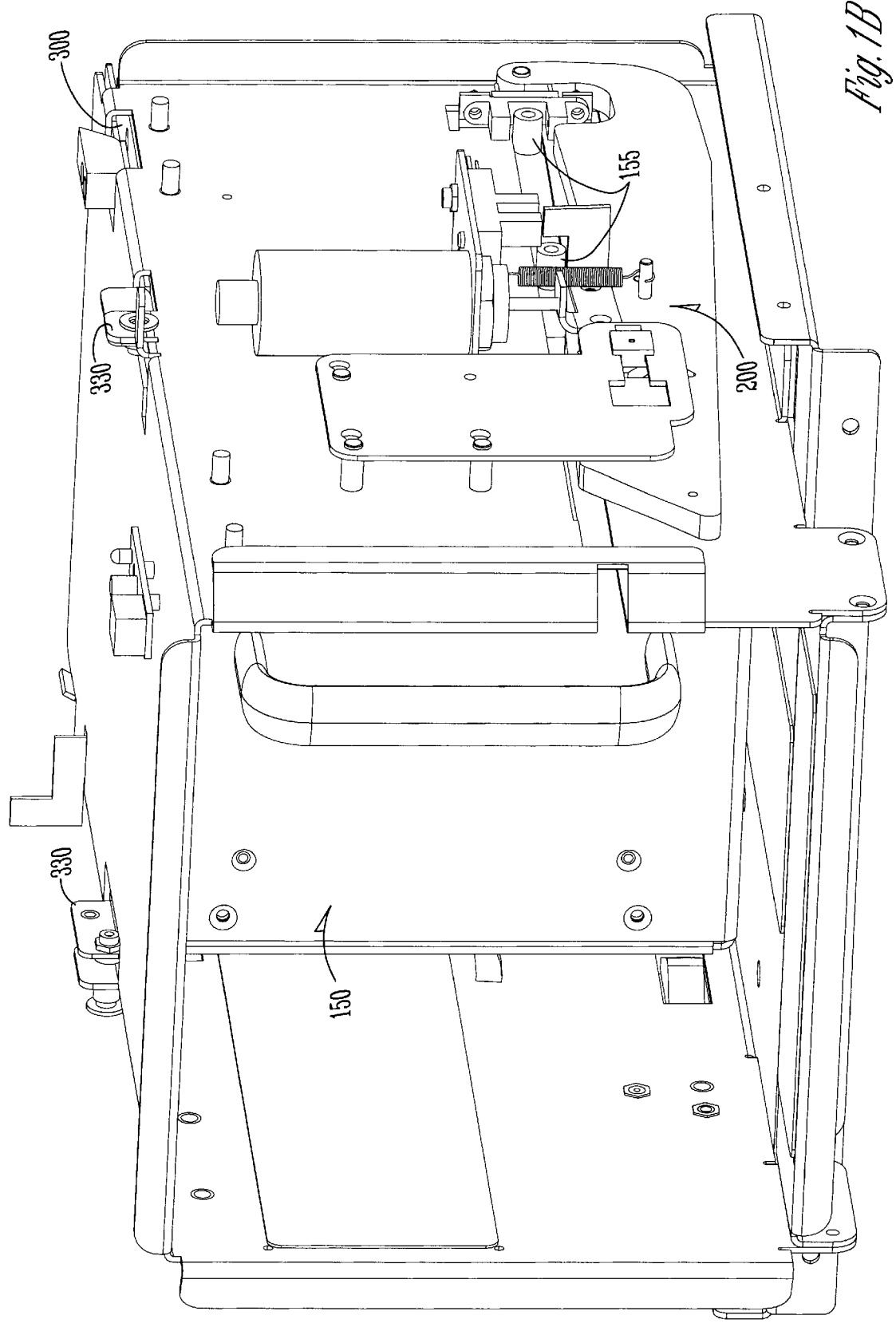

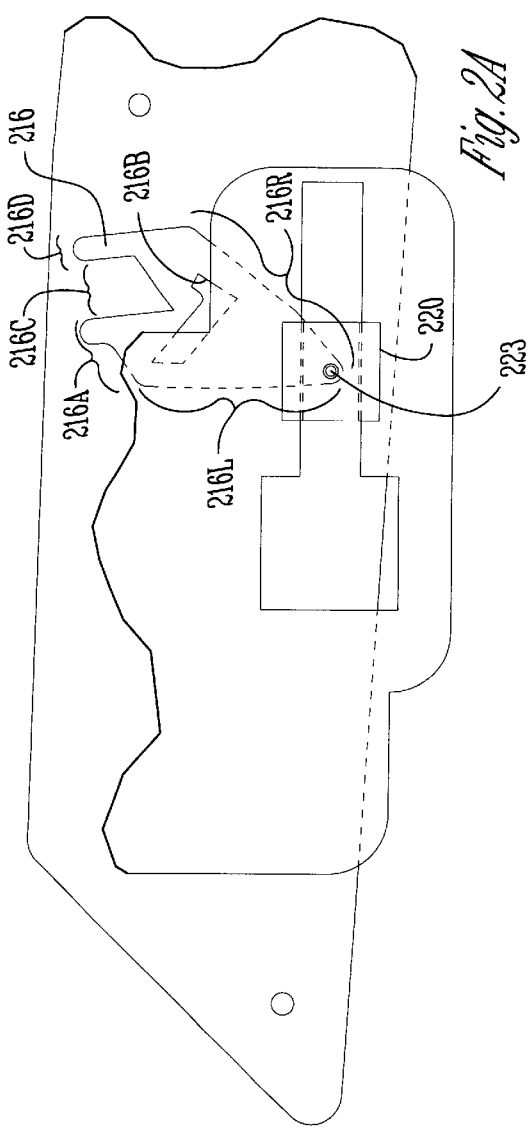
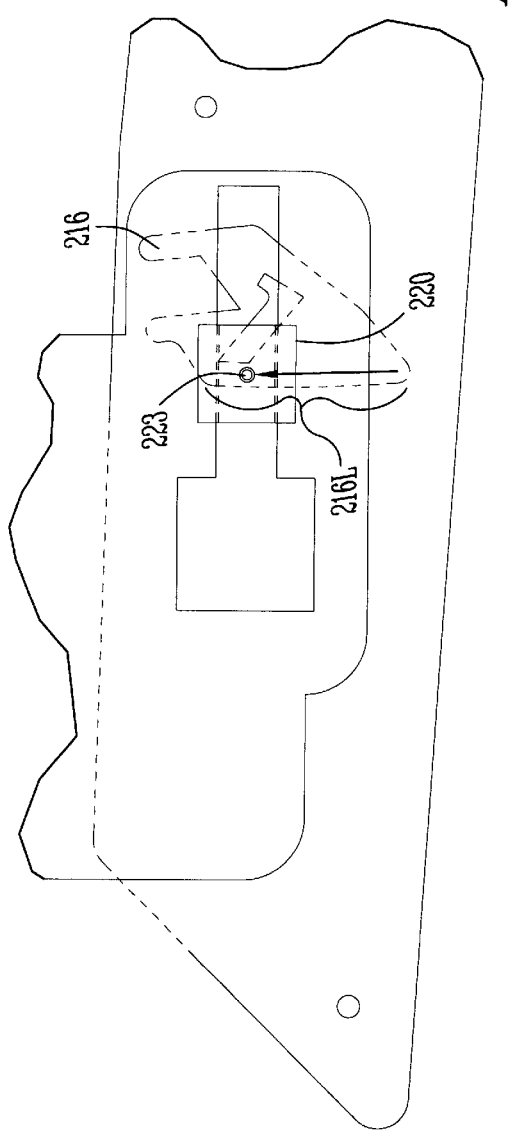

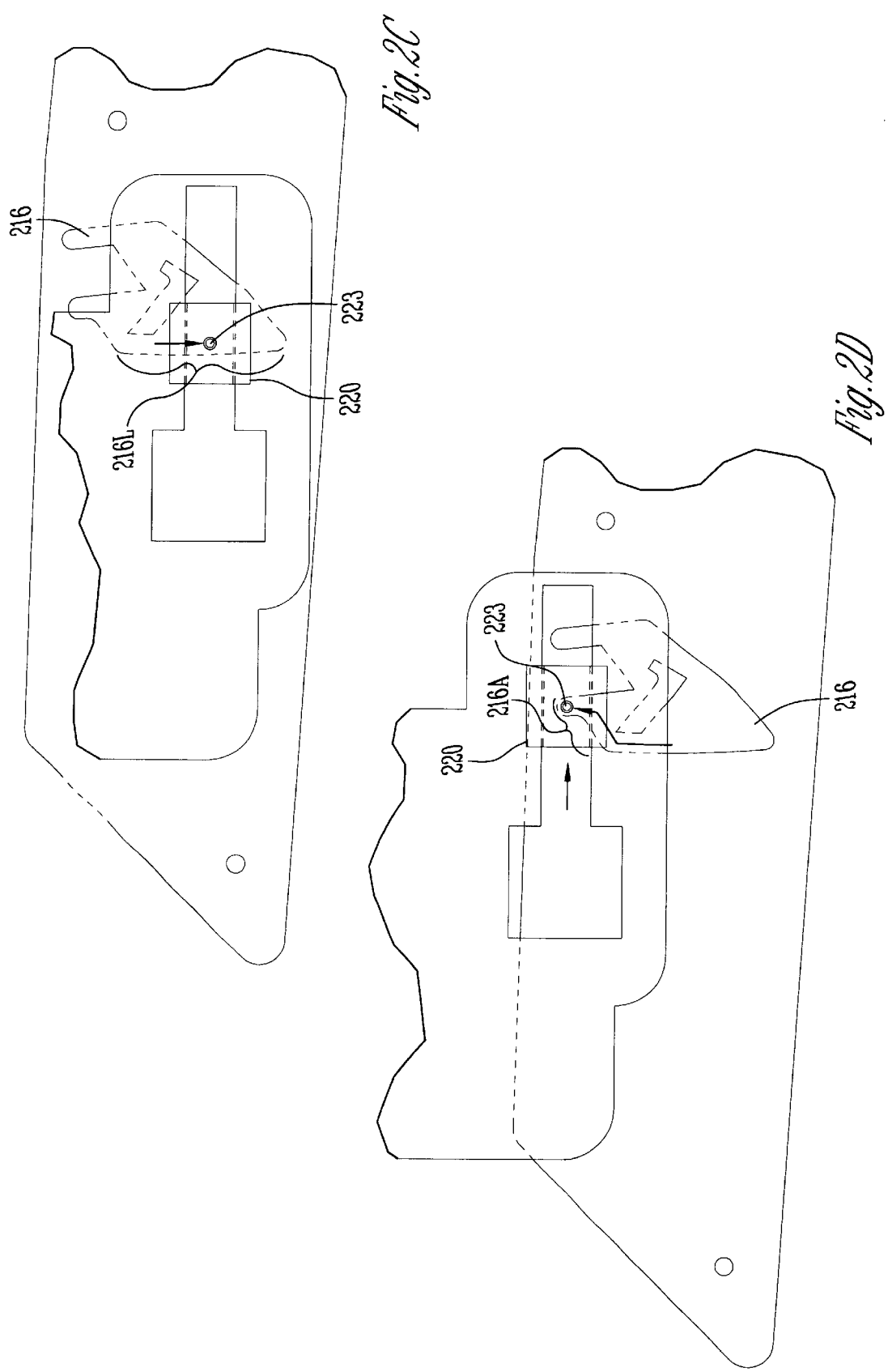

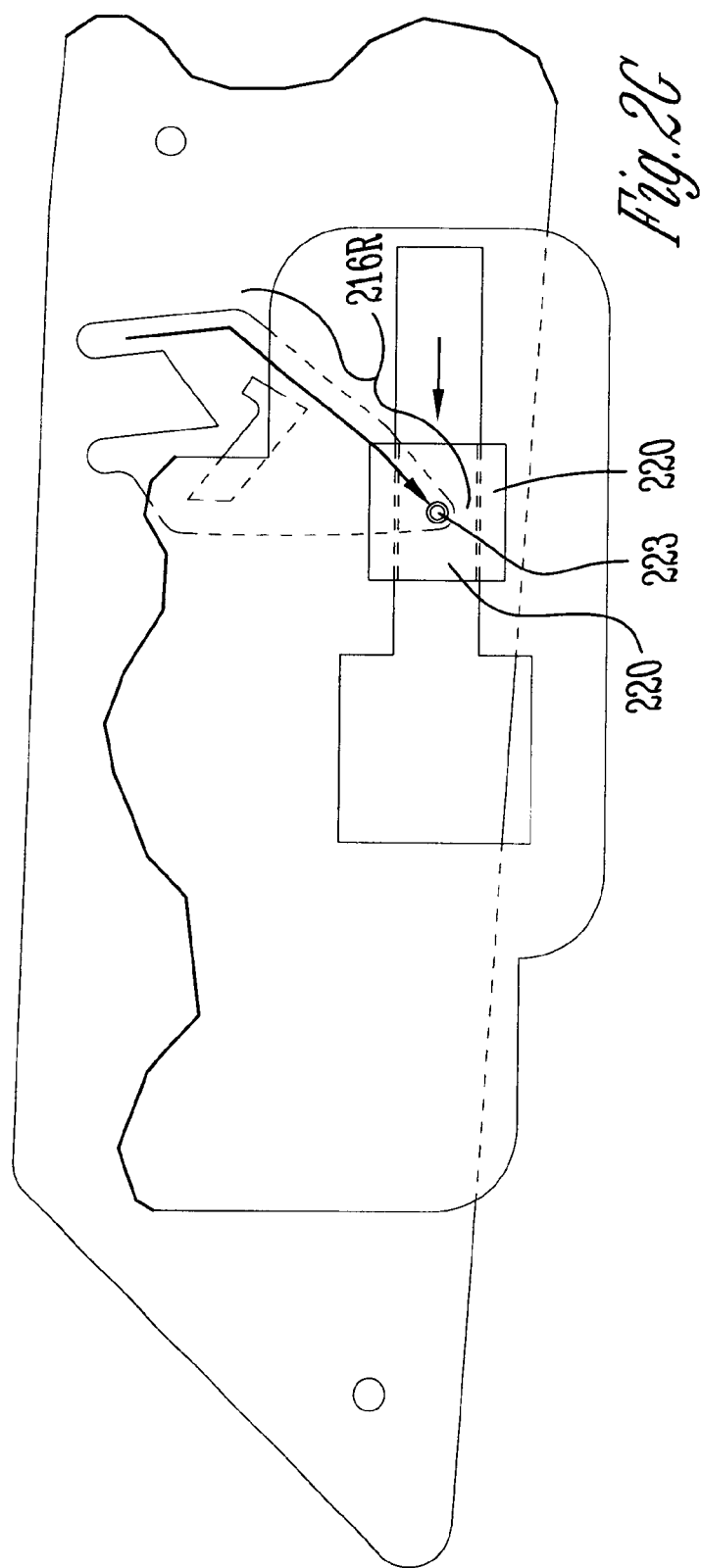

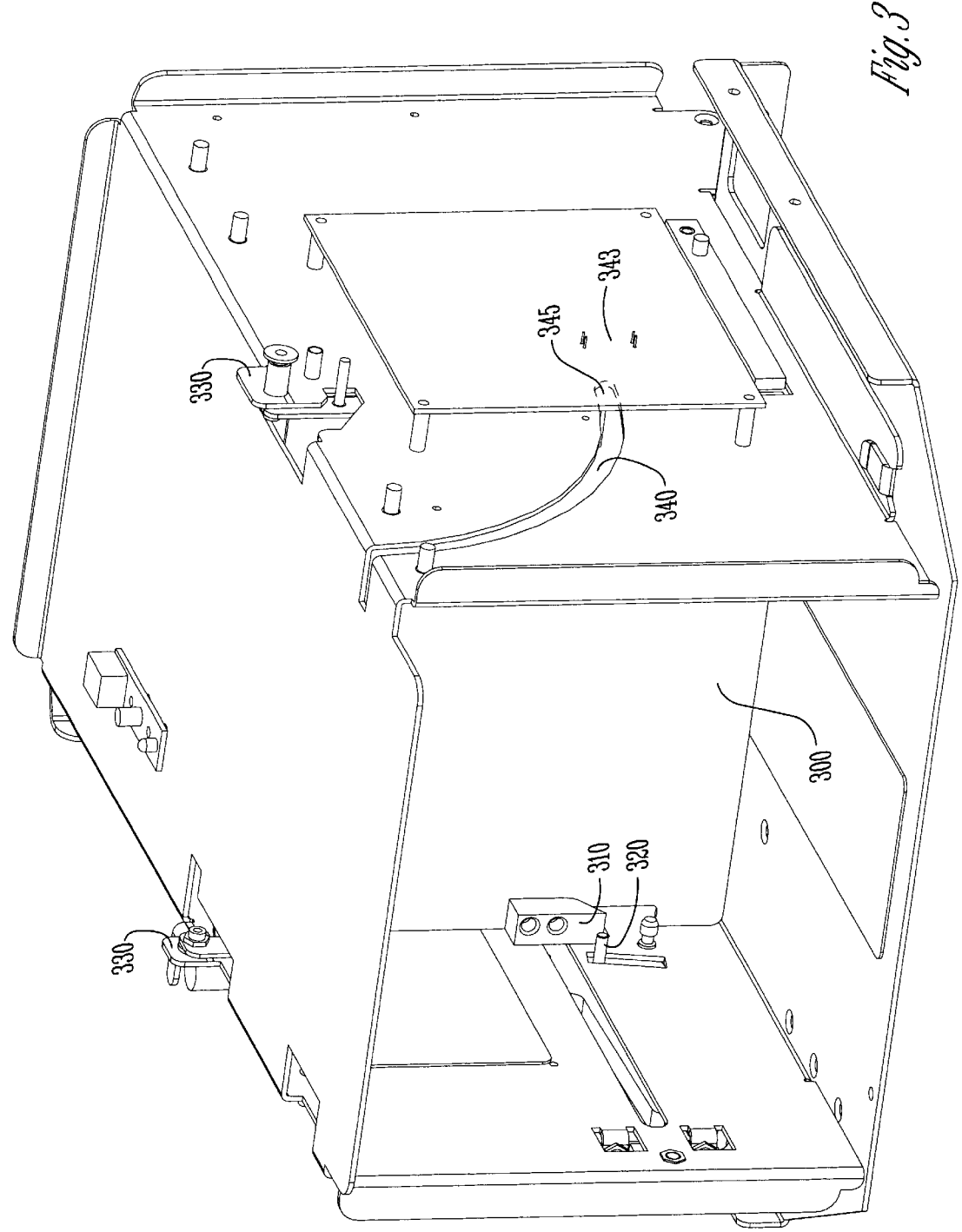

MEDIA MAGAZINE LATCH FOR DATA STORAGE LIBRARIES

TECHNICAL FIELD

The present invention relates to storage devices for holding large numbers of removable media, more particularly to media magazine latch mechanisms for such storage devices.

BACKGROUND

In the computer industry many types of devices are used in conjunction with computers for storing and managing data. One such device is a library having large numbers of storage slots for storing removable media. Media generally comprise a magnetic or optical material in the shape of a disk or tape, store computer readable data, and are surrounded by a plastic housing. A library user, generally a robot arm, sometimes called a picker or MTA, inserts and extracts media from the library containers.

To allow the users of libraries easy access to their media, devices in use today have media magazines. A media magazine is a removable container that holds one or more pieces of media so as to allow a user to insert the media into the library or to remove it from the library. To provide access to the media magazine, many libraries in use today have an access door, a latch mechanism, and a solenoid. An access door is a door at the front of the library that must be moved up, down, or aside to provide passage to the media magazine as it is inserted or extracted from the library, thus allowing access to the magazine when opened. Another common element of many libraries is a latch mechanism. Once a media magazine is inserted into the library, it engages a latch mechanism which holds the media magazine in place inside a container. Yet another common element of many libraries is a solenoid unit, including a solenoid coil and a metal plunger. The solenoid coil produces a strong magnetic force when a current is passed through it, which magnetic force manipulates the metal plunger to provide force and motion to the mechanism. Solenoids are often used to release the media magazine free from the latch mechanism so that the media magazine can be removed.

The overall design of conventional latch mechanisms can be very complex. Latch mechanisms used today utilize numerous small mechanical and electronic components, such as electronic sensors or motors. Those many small mechanical and electronic components can easily add significant product costs. A complex design, with many parts and components, also increases the possibility of malfunction and difficulty of repair. Furthermore, a complex design may even require the use of software or advanced timing circuitry.

In addition to complex designs of latch mechanisms, some overall library designs overutilize solenoids in conjunction with the latch mechanism. More specifically, some designs require that a solenoid maintain a current within its coil for prolonged periods of time while waiting for a user to remove a magazine, while other designs utilize more than one solenoid when latching or unlatching the magazine into the library. These prolonged or excessive uses of solenoids increase power consumption and potentially reduce product life.

Yet another disadvantage of current libraries is the lack of protection to internal components provided by a safety door. A safety door can block access to foreign objects, such as dust, as well as providing protection to the user from contact with internal components.

Thus, contemporary libraries utilize unnecessarily complex and expensive latch mechanisms, overutilize solenoids, and provide little to no protection to internal parts beyond the limited function of an access door. Therefore, there exists a need for a library that utilizes a latch mechanism that is simple, efficient, and reliable in design and utilizes fewer costly, power consuming parts or circuitry; that makes limited use of solenoids; and that provides protection to internal parts.

SUMMARY OF THE INVENTION

The present invention provides solutions to the disadvantages of current storage devices. A media magazine container, according to the invention, has a recirculating latch mechanism that makes minimal use of a solenoid and includes a safety door. An exemplary embodiment of the latch mechanism includes a contoured latch arm with a configured opening and a shoulder; a slider moving in a slider track and coupled to the latch arm; and a restoring device, such as a spring, for providing a counteractive force. As a magazine is inserted into the container, it encounters the latch arm in a position ready to receive it. The magazine then slides along the contour of the latch arm, forcing it downward and causing the configuration in the latch arm to interact with the slider. The interaction between the slider and configured opening controls the movement of the latch arm, which movement of the latch arm guides the magazine toward the latch arm shoulder. As the magazine moves further into the container, the spring lifts the arm upward keeping the magazine in constant contact with the arm contour, and when the magazine reaches the shoulder in the latch arm, the magazine becomes locked in place. The magazine can be easily unlatched by forcing the latch arm downward causing the slider and configured opening to interact. As the magazine is extracted from the container, the slider and configured opening interact in such a manner that when the magazine is fully extracted, the latch arm is back to the original position where it first received the magazine, and is ready to receive another.

One aspect of the exemplary embodiment includes a detaching means, such as a solenoid or a mechanical lever, to assist in the unlatching of the magazine. The design of the latch mechanism allows the magazine to be extracted by a simple, momentary use of the detaching means which forces the latch arm downward long enough for the magazine to detach from the latch arm shoulder. Interaction between the slider and configured opening prevents the latch arm from locking the magazine in place again. If the detaching means is a solenoid, a momentary use allows for very limited power consumption.

Another aspect of the exemplary embodiment includes a safety door and where the latch mechanism can actuate both the safety door and an access door. The latch mechanism includes a latch arm with an end and a stroke. The end connects to an access door via an access door coupling and the stroke connects to a safety door via a safety door coupling. The design of the latch mechanism actuates the access door and safety door at proper times during insertion and extraction of the magazine, providing security to the internal parts of the container.

The advantages of the present invention will become apparent to those skilled in the art as they consider the following detailed description and its accompanying drawings.

THE DRAWING

FIG. 1B shows the media magazine of FIG. 1A inserted into the container of FIG. 1.

FIGS. 2A–2G are a series of time-lapse views showing the operation of the latch mechanism shown in FIG. 2.

FIG. 3 is a cut away rear view of the container of FIG. 1.

DETAILED DESCRIPTION

The following detailed description describes the present invention in sufficient detail to enable those skilled in the art to understand and utilize the invention. However, it must be understood that other embodiments exist and that changes may be made to the various embodiments of the invention without departing from the spirit and scope of the present invention. Therefore, the following detailed description is not to be taken in a limiting sense, and the scope of the invention is defined only by the claims.

Figure 1:
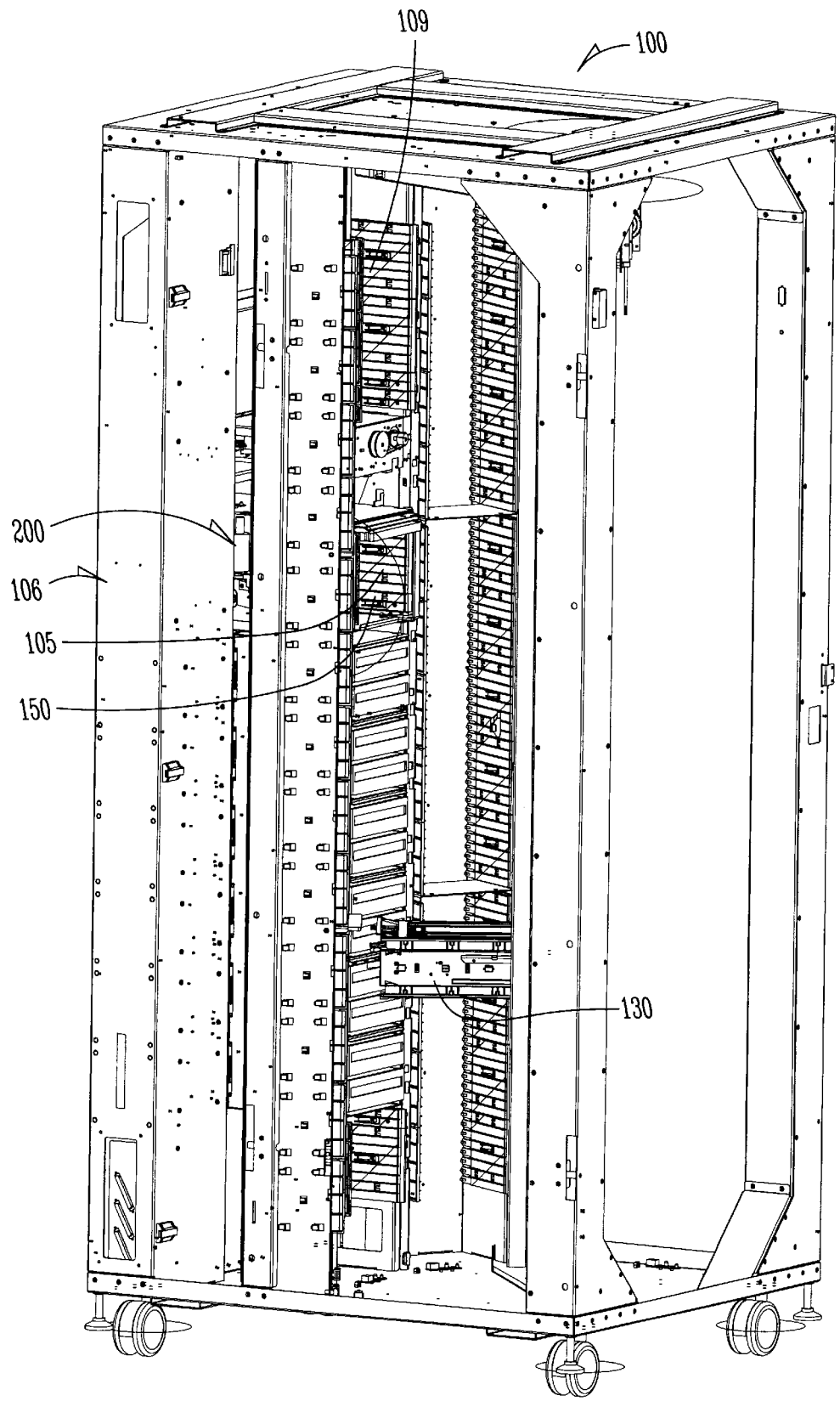
FIG. 1 shows a library including a latch mechanism according to the present invention.
Figure 1A:
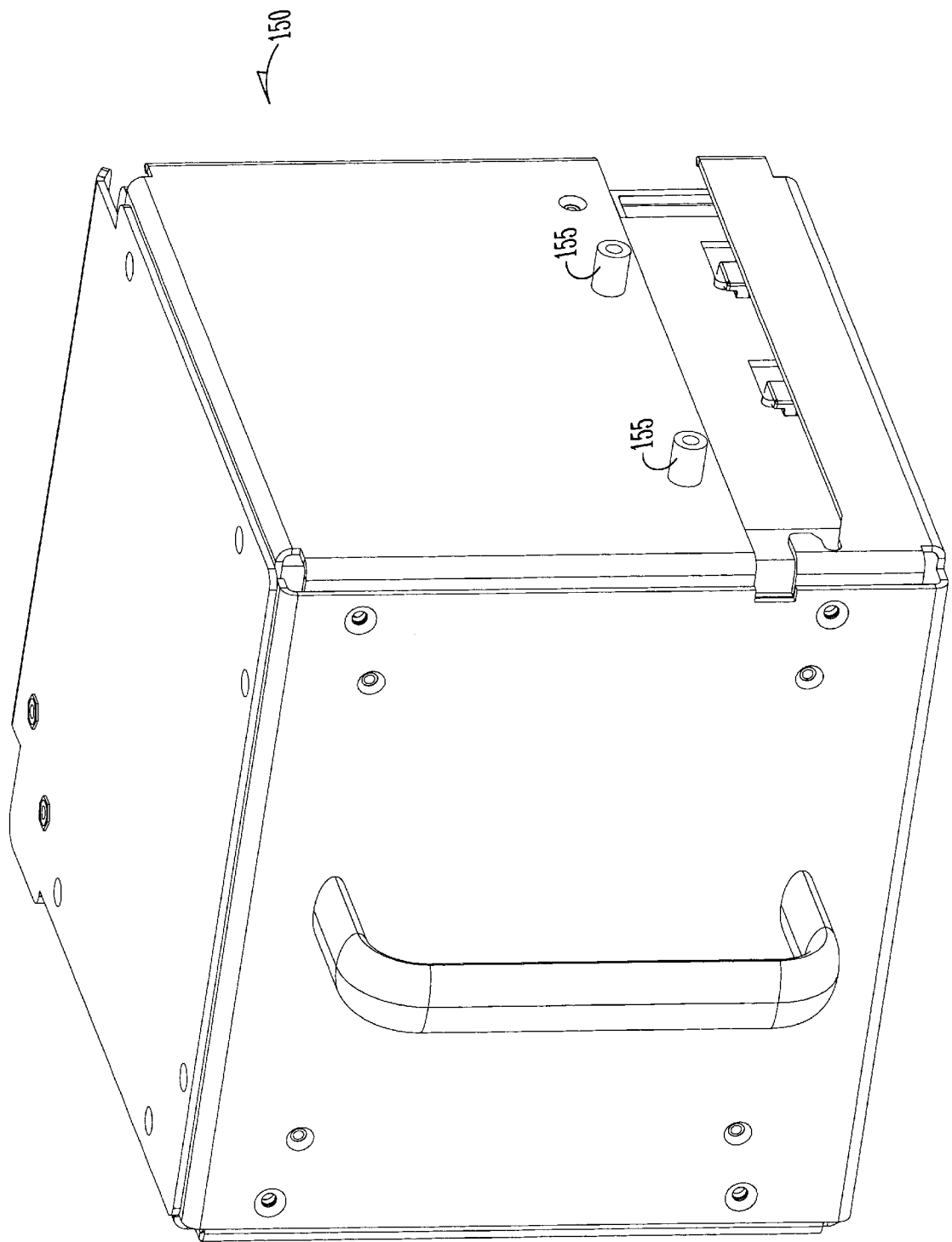
FIG. 1A shows a typical media magazine for the library of FIG. 1.
Figure 2:
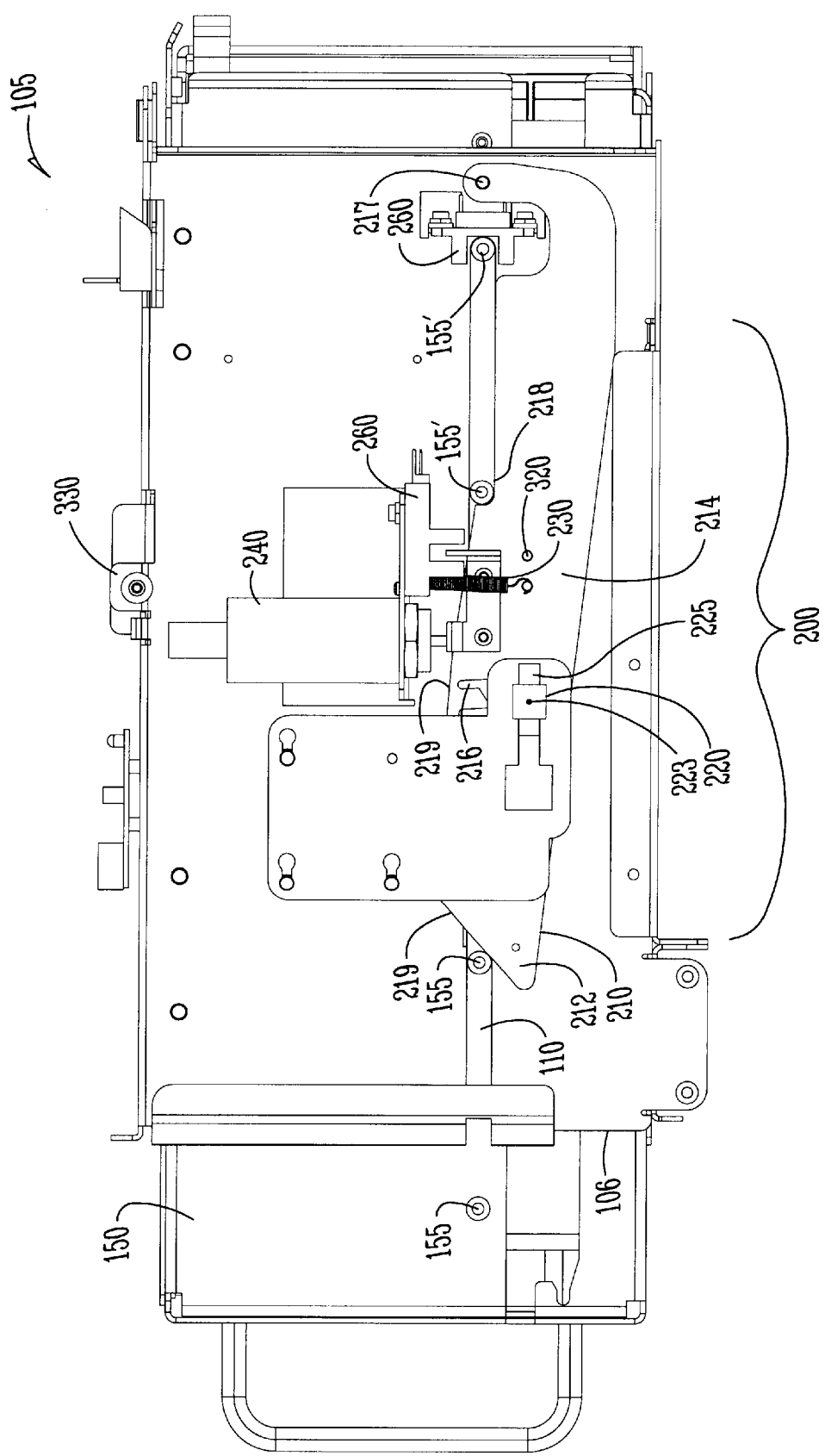
FIG. 2 is a side view of the container of FIG. 1.

FIG. 1 shows a library 100 comprising a container 105, possessing a holding mechanism, such as a magazine latch 200, an access door 400 (shown in FIG. 4) at the rear area 106 of the container, and a media magazine 150 (shown in the latched position). The library 100 is of any kind typically used in the industry today where an insertion/extraction device 130, such as a robot picker-arm, inserts and removes the media. The library 100 is of no particular shape or size, and the number of containers 105 in the library can vary. The library 100 is used to house media within storage slots 109, and has a container 105 that holds a media magazine 150. A container 105 can receive a typical magazine 150 with magazine pins 155. The magazine pins 155 can slide into the magazine track 110 as shown in FIG. 2. As a magazine 150 is pushed into, or pulled out of, the container 105, the magazine pins 155 engage the latch mechanism 200 that unlocks a safety door 300 (shown in FIG. 3), allowing the magazine 150 to be fully inserted into the container 105. Thus, unless a magazine 150 is inserted into the container 105, the safety door will not unlock nor open. When the magazine 150 is fully inserted, the safety door 300, swings backward on safety door hinges 330.

FIG. 2 is a side view perspective of one of the containers 105 of FIG. 1 showing the multiple parts of an exemplary embodiment of a latch mechanism 200 including a latch arm 210, a slider 220, an actuator 240, and a restorer 230. The latch arm 210 includes an end 212, a stroke 214, a configured opening 216, a shoulder 218, and a contour 219. The slider 220 rides in a slider track 225 and moves side to side within its track 225 as a function of both the shape of the configured opening 216 and the up and down movements of the latch arm 210. The slider 220 is connected to the configured opening 216 by a slider coupler, exemplified in FIG. 2 as a slider pin 223.

When a magazine 150 is inserted into the magazine track 110 on the container 105, the magazine pins 155 ride along the contour 219 of the latch arm 210 pushing the latch arm 210 downward as it rotates about a pivot point 217. The downward pushing force caused by the magazine pins 155 riding along the contour 219 is counterbalanced by the restoring mechanism, restorer 230, which pulls up on the latch arm so that the magazine pins 155 and the contour 219 maintain constant contact. The restorer 230 in the figure is depicted by a spring, but could be any mechanism that provides an upward force to the latch arm 210, such as a pair of magnets, a tensioned pulley system, or a taut rubber strip. Additionally, the restorer 230 here depicted is connected to the stroke 214 of the latch arm 210; however, it can be connected to other places on the latch arm 210, for instance, at the pivot point 217. The restorer 230 could also be a tension or torsion device connected to the pivot point 217 causing resistance to the rotation of the latch arm 210, essentially providing a counteracting force to the downward force of the magazine pins 155.

As the magazine 150 is further pushed along the magazine track 110, the magazine pins 155 eventually move past the contour 219 into the shoulder 218 of the latch arm 210 latching the magazine 150. The latched magazine pins are depicted as 155'. The shape of the shoulder 218 will not allow the latched magazine pins 155' to move back out of the magazine track 110 until the latch arm 210 is detached.

The actuator 240 is a mechanism that provides a thrust to the latch arm 210 to detach a latched magazine. In the figure, the actuator 240 is depicted as a solenoid providing a downward thrust; however, the actuator can be anything that provides a thrust, such a mechanical lever arm. Also, although the latch arm 210 must be forced downward, the actuator 240 itself does not have to thrust downward; it could be attached to the lever arm from below, thus providing a downward pull instead of a downward thrust. When the actuator 240 forces the latch arm 210 downward, the slider 220, slider pin 223 and configured opening 216 interact in a manner that prevents the shoulder 218 from retaining the magazine pins 155', and thus the magazine pins 155 are released and the magazine 150 is ready to be extracted from the container 105.

Other elements may be added to this design to improve efficacy of its operation. For instance, electronic sensors 260 could be included which monitor the position of the magazine pins 155,155' indicating to the user by means of an LED that the magazine 150 is in a latched position. Control circuitry and components may also be added to synchronize the movement of the parts.

FIGS. 2A–2G are a series of time elapsed drawings showing the interaction of some of the parts of the latch mechanism of FIG. 2 during insertion and extraction of the magazine. Shown in each drawing 2A–2G are the interacting positions of the slider 220, slider pin 223, and configured opening 216. The exemplary configured opening 216 is divided into several portions: left side 216L, right side 216R, top left configured portion 216A, center section 216B, top center portion 216C, and top right portion 216D. Heavy straight arrows in some of the figures indicate direction of movement.

FIG. 2A depicts the position of the slider 220, slider pin 223 and configured opening 216 before the magazine 150 is inserted into the magazine track 110 of FIG. 2. The slider pin 223 begins at the bottom most portion of the configured opening 216. As the magazine 150 is inserted and the magazine pins 155 are pushed along the latch arm contour 219, FIG. 2B shows how the configured opening 216 moves downward, causing the latch pin 223 to be positioned along the left side 216L. When the magazine pins 155 enter the shoulder 218, Figure C shows the configured opening 216 moving upward, causing the latch pin 223 to be positioned on the left side 216L. The latch pin 223 will remain is the final position depicted in FIG. 2C until the actuator 240 forces the latch arm 210 downward.

Figure 2E:
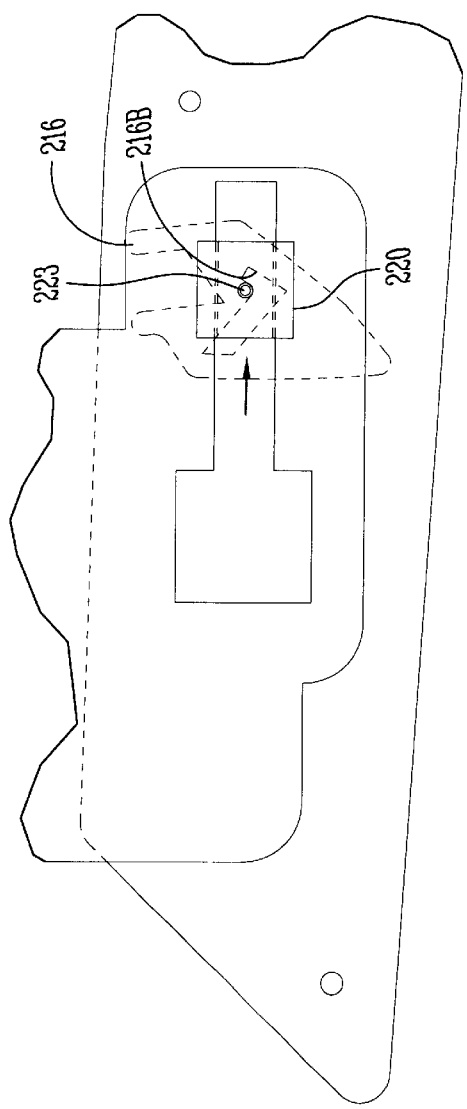

When the actuator 240 forces the latch arm 210 downward with enough force, FIG. 2D shows how the configured opening 216 will move downward enough so that the slider pin 223 will encounter the top left configured portion 216A. The top left configured portion 216A has a shape that will force the slider pin 223 sideways, thus forcing the slider 220 sideways. When the actuator 240 stops forcing the latch arm 210 downward, the restorer 230 forces the latch arm 210 back up, thus causing the configured opening 216 to move upward, as depicted in FIG. 2E. However, since the slider pin 223 moved sideways into the top left configured portion 216A, as the configured opening 216 moves upward the slider pin 223 encounters the center piece 216B. When the slider pin 223 encounters the center piece 216B, the latch arm 210 is restricted from moving upward, and the magazine pins 155 will not latch back into the shoulder 218.

Figure 2F:
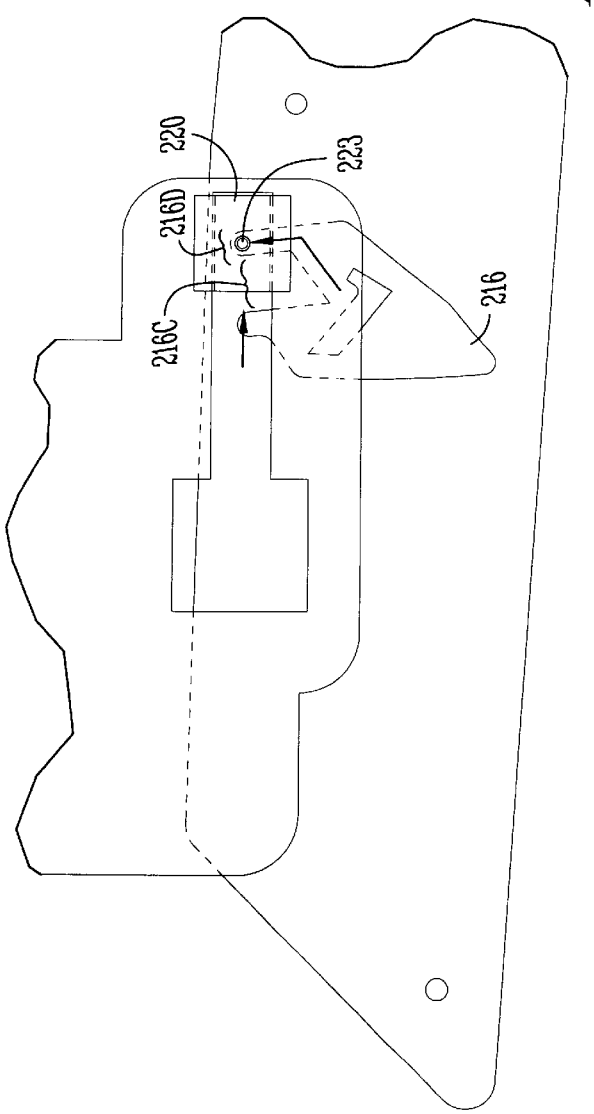

When the magazine 150 is later extracted, it again rides the contour 219 of the latch arm 210, thus forcing the latch arm 210 downward, causing the configured opening 216 to move downward causing the slider pin 223 to move upward and encounter top center configured portion 216C, as depicted in FIG. 2F. As the magazine pins 155 move forward along the contour 219 on their way out of the container 105, the configured opening 216 continues to move downward causing the slider pin 223 to continue to move upward until it encounters top right configured portion 216D. As the slider pin 223 moves sideways as shown in FIGS. 2D–2F, the slider 220 also moves sideways, until the slider pin 223 is in the final position shown in FIG. 2F. When the magazine 150 is extracted to the point where the magazine pins 155 no longer ride the contour 219, then the latch arm 210 moves upward, causing the configured opening 216 to move upward, causing the latch pin 223 to move along the right side 216R as shown in FIG. 2G, causing the slider 220 to move sideways until it again positioned as it was in FIG. 2A.

As can be noted from FIGS. 2A–2G, the slider pin 223 circulates entirely around the configured opening 216 throughout the insertion, latching, and extraction of the magazine 150. Hence, the latch mechanism is a recirculating latch, one where a member follows a closed path in a latch/unlatch cycle, but does not merely retrace itself during a single cycle.

FIG. 3 is a cut away, rear view of one of the containers 105 of FIG. 1 showing how the safety door 300 and latch mechanism 200 interact. The safety door 300, connected to safety door hinges 330, resides inside the container 105. A latch tooth 310, connected to the safety door 300, is obstructed by a safety door coupling such as pin 320, preventing the safety door 300 from swinging on its safety door hinges 330. When a media magazine enters the container 105, (as shown in FIG. 2) and the magazine pins 155 begin to ride along the arm contour 219, the latch arm 210 moves downward. As a result, safety door pin 320 also moves downward so that it no longer obstructs the latch tooth 310, thus permitting the safety door 300 to swing backward on its safety door hinges 330. To help provide feedback to the machine as to the position of the safety door 300, a safety door track 340 may be used in conjunction with a safety door flag 345. The safety door flag 345 interacts with a sensor on the circuit board 343 to indicate the position of the safety door to the system. To keep the safety door 300 from swinging forward on its hinges 330, the safety door track 340 only extends backward in a quarter arc shape. The safety door track 340 and safety door peg 345 are not necessary to the proper function of the safety door, as the principal function of the safety door is to prevent access from the front portion of the container 105. Nevertheless, even if a safety door track 340 is not used, the safety door 300 can still be prevented from swinging forward in other ways, such as using only backward swinging safety door hinges. Additionally, the positions of the hinges 330 and track 340 need not be limited to the positions shown in FIG. 3. The hinges could be at the bottom or side of the safety door 300 and still serve the same function; the track would only need to be rotated accordingly.

Figure 4:
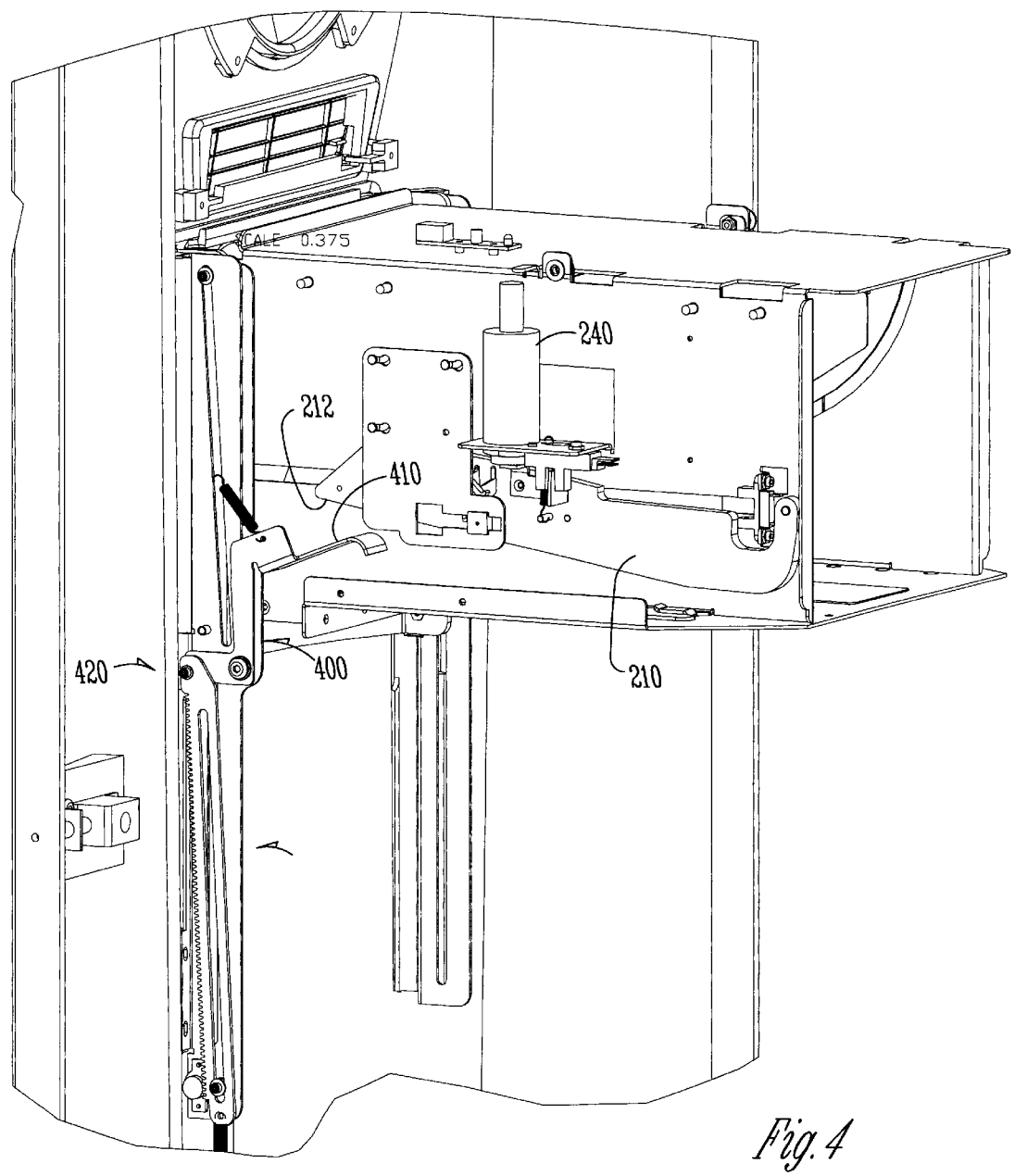
FIG. 4 is perspective of the container of FIG. 1.

FIG. 4 is an angled perspective of one of the containers 105 of FIG. 1 showing how the access door 400 can be actuated by the latch mechanism 200. The access door 400 is connected to an access door mechanism 420 which causes the access door 400 to open and close. An access door latch 410 is coupled to the door mechanism 420. When the latch arm 210 is thrust downward by the actuator 240, the latch arm end 212 contacts latch 410, actuating access door mechanism 420.

The above detailed description is illustrative. It is not intended to be restrictive. Upon review of the above detailed description, one skilled in the art will no doubt see many other embodiments within the full scope and nature of the invention. Therefore, the full scope of the invention should be construed in reference to the language of the claims and all equivalents thereof.

What is claimed is:

1. A latch mechanism for a media storage library having a plurality of containers for media magazines, the latch mechanism comprising:

a latch arm for engaging a media magazine when the magazine is inserted into one of the plurality of containers and for latching the magazine into a locked position when the magazine is fully inserted into the container, wherein the latch arm includes a configured opening and a shoulder;

a slider for moving backward and forward within a slider track according to an interaction with the configured opening, the interaction between the slider and the configured opening being a function of upward and downward movement of the latch arm;

a slider coupler for coupling the slider to the opening in the latch arm;

a restorer connected to the latch arm for providing a force to the latch arm allowing the media magazine to become locked into the latch arm shoulder when fully inserted; and a solenoid for moving the latch arm so as to unlatch the media magazine.

2. A latch mechanism for a storage library having a plurality of containers for media magazines, the latch mechanism comprising:

a latch arm for engaging a media magazine when the media magazine is inserted into one of the plurality of containers and for latching the magazine into a locked position when the magazine is fully inserted into the container, wherein the latch arm includes a configured opening;

a slider coupled to the configured opening of the latch arm, wherein the slider and configured opening interact as a function of the latch arm's movement, and wherein the slider and configured opening assist the latch arm in latching and unlatching the magazine;

a slider coupler for coupling the slider to the configured opening; and electronic sensors to monitor at least one of the position of the magazine within the container and the position of the latch.

3. A latch mechanism for a storage library having a plurality of containers for media magazines, wherein each container has a safety door, the latch mechanism comprising:

a latch arm for engaging a media magazine when the magazine is inserted into one of the plurality of containers and for latching the magazine into a locked position when the magazine is fully inserted into the container, wherein the latch arm comprises a configured opening, a shoulder, an end, and a stroke;

a slider coupled to the configured opening of the latch arm, wherein the slider and configured opening interact as a function of the latch arm's movement, and wherein the slider and configured opening assist the latch arm in latching and unlatching the magazine; and a safety door coupling connected to the latch arm for latching the safety door when the magazine is removed from the container and for unlatching the safety door when the magazine is inserted into the container.

4. A method for holding a media magazine in a container, the method comprising:

positively engaging a latch mechanism with a media magazine inserted into the container, the latch mechanism comprising a contoured latch arm with a configured opening and a shoulder, and a slider that moves in a slider track and is coupled to the latch arm;

sliding the magazine along the contour of the latch arm toward the latch arm shoulder;

forcing the latch arm to move so as to cause the configuration in the latch arm to interact with the slider;

latching the magazine into the latch arm shoulder;

activating an actuator;

forcing the latch arm to move so as to cause the magazine to disengage from the latch arm shoulder and further causing the slider and configured opening to interact; and sliding the magazine along the contour of the latch arm away from the latch arm shoulder to allow the extraction of the magazine from the container.

5. The method of claim 4 wherein the actuator is a solenoid.

6. The method of claim 4 wherein the actuator is a mechanical lever.

* * * * *